United States Patent [19]

Sicignano et al.

[11] 4,432,810
[45] Feb. 21, 1984

[54] METHOD FOR IMPROVING LUMINESCENCE AND ELECTRICAL PROPERTIES IN SEMICONDUCTOR MATERIALS BY ELECTRON IRRADIATION AT LIQUID NITROGEN TEMPERATURES

[75] Inventors: Albert Sicignano, Mt. Kisco, N.Y.; Christiaan J. Werkhoven; Werner F. van der Weg, both of Eindhoven, Netherlands

[73] Assignee: U.S. Philips Corporation, New York, N.Y.

[21] Appl. No.: 353,128

[22] Filed: Mar. 1, 1982

[51] Int. Cl.$^3$ .......................................... H01L 21/263
[52] U.S. Cl. ................................... 148/1.5; 29/569 L; 148/175; 148/187; 357/30; 357/91
[58] Field of Search ..................... 148/1.5, 187, 175; 29/569 L; 357/30, 91

[56] References Cited

PUBLICATIONS

Pegler et al. Radiation Effects, 15 (1972) 183.
Zhong et al., Radiation Effects, 56 (1981), 251.
Davies et al., Appl. Phys. Letts., 35, (1979), 631.
Queisser, Appl. Phys, 10, (1976), 275.

Primary Examiner—Upendra Roy
Attorney, Agent, or Firm—Paul R. Miller

[57] ABSTRACT

Luminescent materials are formed by annealing a luminescence sample with a high energy electron beam at temperatures near the vicinity of liquid nitrogen temperatures.

11 Claims, 3 Drawing Figures

METHOD FOR IMPROVING LUMINESCENCE AND ELECTRICAL PROPERTIES IN SEMICONDUCTOR MATERIALS BY ELECTRON IRRADIATION AT LIQUID NITROGEN TEMPERATURES

The present invention is directed to a process for annealing materials used in luminescense applications in which significant improvements are achieved for optical and electrical properties of the material.

BACKGROUND OF THE INVENTION

Annealing solid state materials has been carried out in various prior art techniques for the purpose of reducing damage. For example, electron beam annealing has involved the technique of reducing or correcting damage occuring in ion implantation of the semiconductor material. Attention is directed to LASER AND ELECTRON BEAM PROCESSING OF MATERIALS, edited by G. W. White and P. S. Peercy Academic Press, 1980, and LASER AND ELECTRON BEAM SOLID INTERACTIONS AND MATERIAL PROCESSING, edited by J. F. Gibbons, L. D. Hess, T. W. Sigmon, North Holland Publishing, New York, 1981.

SUMMARY OF THE INVENTION

The present invention provides a significantly improved annealing technique in which the electrical and optical properties of the semiconductor material are significantly improved. In particular, the present invention provides cooling of the material during electron beam annealing so as to effect substantial improvements in the optical and electronic properties.

In essence, the process of the present invention provides for the insertion of a luminescence material, such as a semiconductor sample, or other type material used in luminescence applications, into an enclosed region, providing a vacuum in the enclosed region, simultaneously cooling the material or sample to the vicinity of liquid nitrogen temperatures, and exposing this material or sample to a high energy electron beam to cause annealing of the material.

The essential feature of the present invention occurs in the cooling of the material prior to annealing. Effectively, such cooling is to low temperatures, such as at least 87° K.

By this process, substantial increases in luminescence efficiency, a change in the wavelength intensity distribution, better linearity of luminescence intensity verses excitation density, and a possible change of the material conductivity can result.

The effects of this improved technique is that selective changes in the properties of a luminescent material can be provided, for example in electron beam writing. Thus, one can selectively provide changes in the luminescence behavior with spatical resolutions of one micron or better.

Moreover, the application of the low temperature annealing technique to luminescent displays, cathode ray tube (CRT) phosphors, as well as optical storage, can result in very efficient structures.

By carefully studying differences between annealed materials and unannealed materials, a basic understanding of the mechanisms controlling the optical and electrical behavior results. This is an important feature in understanding and using semiconductor materials.

It is reasonable to expect that the low temperature annealing technique of the present invention can be extended to various families of luminescence materials, including semiconductor materials, both in the group II–VI and III–V compounds. In this respect, an area of interest exists in CRT phosphors which may improve by electron beam annealing in-situ, i.e. in a CRT in order to improve linearity and efficiency.

BRIEF DESCRIPTION OF THE DRAWINGS

The various aspects of the present invention may be further understood by reference to the accompanying drawing figures which provide an indication of the structure provided by the present invention, and wherein.

DESCRIPTION OF PREFERRED EMBODIMENTS

According to the present invention, it has been found that the significant characteristics and improvements in the properties of materials occur by cooling the sample to low temperatures, approximately to liquid nitrogen temperatures, before undertaking annealing by way of electron beam techniques. It has been found that the effects of the present invention depend critically on the material, as well as parameters of the electron beam (energy and total charge, i.e. $q = i \times t$). Moreover, if the annealing is carried out at room temperatures, no change is seen in the optical and electronic properties of the material.

Consequently, annealing of the materials according to the present invention which can be done, for example, on zinc selenide, ZnSe, or gallium arsenide, GaAs, is carried out by cooling the sample material to at least 77° K. before and during annealing. The annealing is performed on the sample in a vacuum system by way of electron beam annealing techniques. A conventional vacuum system of an oil diffusion pump using a liquid nitrogen baffle may be used to achieve a vacuum of $10^{-6}$ Torr.

For example, if zinc selenide is considered in an undoped condition, annealing may be carried on at 27 KEV with a current of $6 \times 10^{-8}$ amperes over an area of $10 \times 10$ microns. The sample is cooled to the liquid nitrogen temperature before annealing begins.

Figure 1A:
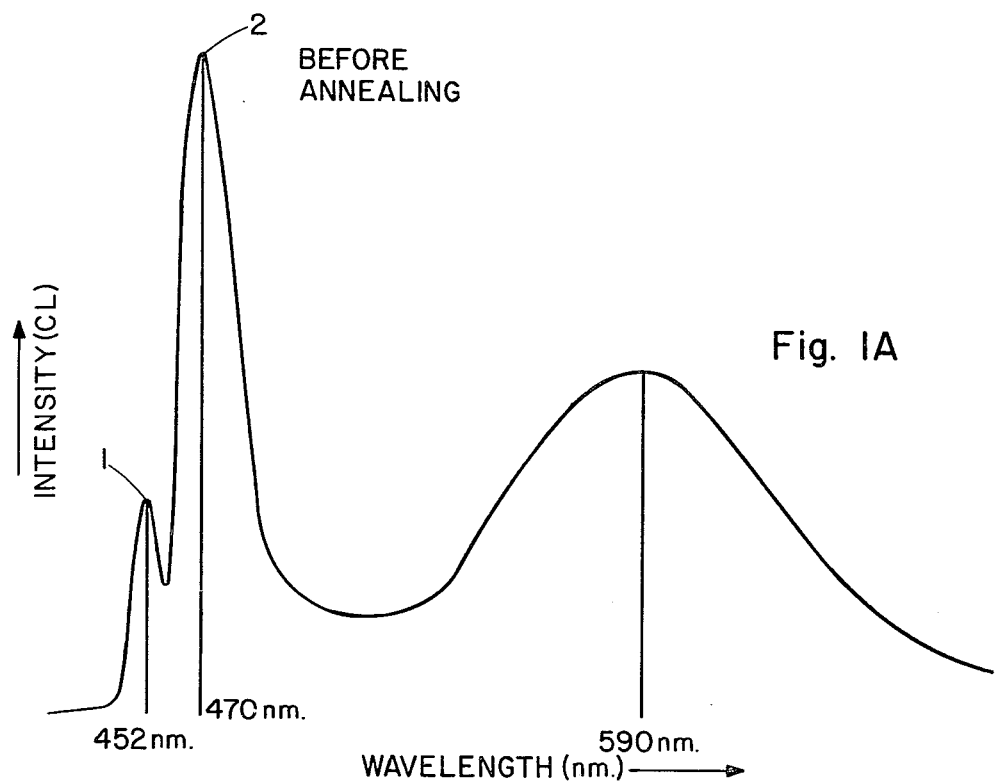
FIGS. 1A and 1B show the effects observed after low temperature electron beam annealing according to the present invention.
Figure 1B:
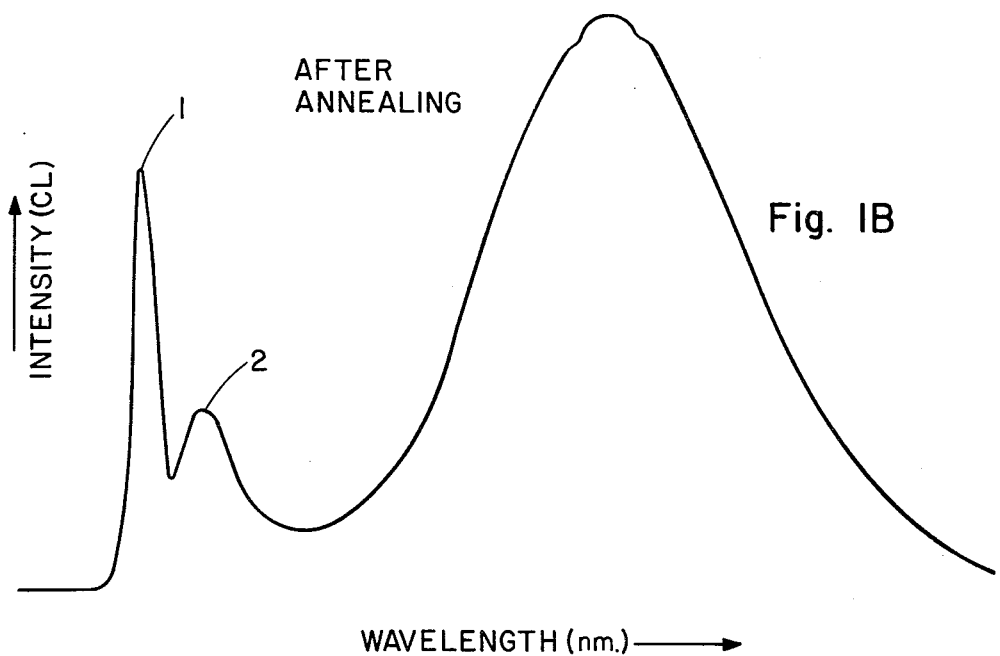

If this is done, the change in photoluminescence spectra may be seen by reference to FIGS. 1A and 1B. In the initial characteristics of the material before annealing, FIG. 1A illustrates wavelength peaks at 452 nanometers and 470 nanometers, which peaks are changed considerably after annealing, as shown in FIG. 1B. Thus, the peak at 452 nanometers is significantly increased over that before annealing, while the heightened peak at 470 nanometers before annealing is considerably reduced after annealing.

It has been found that there is a near linear dependence on the increase in luminescence efficiency with annealing time at critical values of electron beam energy and current for particular luminescence materials. The luminescent efficiency is enhanced if annealing is carried on for a period of 2 seconds through 32 seconds. Moreover, the electron beam annealing may be carried out at voltages ranging from 20 to 26.5 KEV and currents ranging from $4\times10^{-7}$ amps through $6\times10^{-8}$ amps.

Explanation for these effects has not been fully understood, but it is presumed that the technique could be caused by vacancies or impurity defects. For example, impurities such as lithium or sodium moving in zinc selenide may be the effect. On the other hand, copper doped zinc selenide shows no change.

In the use of gallium arsenide, a most positive effect is seen with silicon doping which causes a substantial increase in total luminescence.

Figure 2:
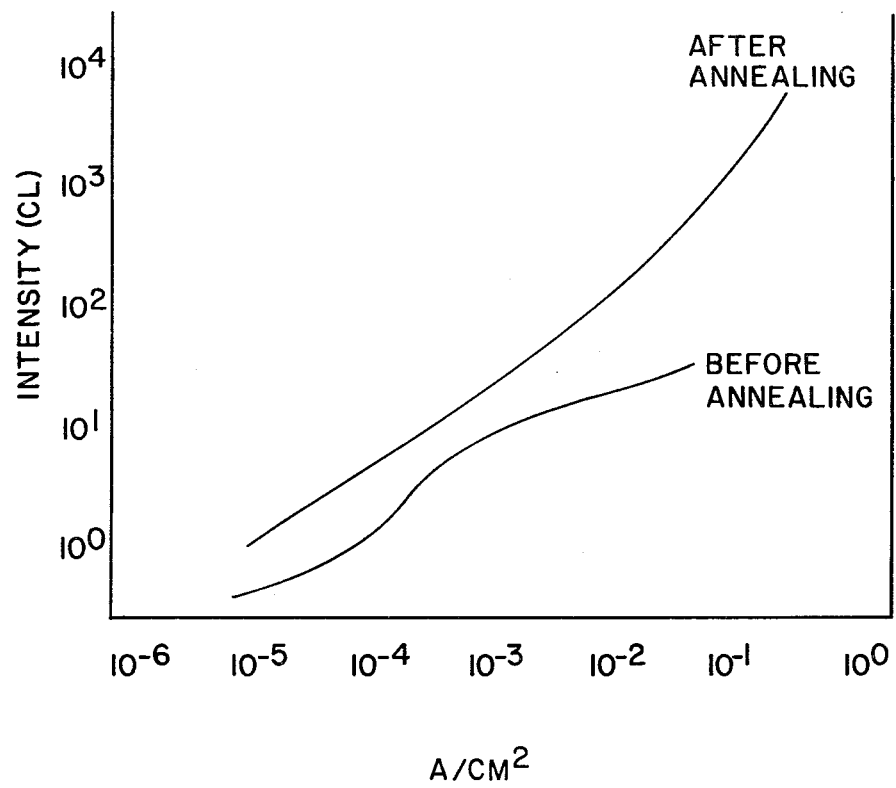
FIG. 2 illustrates another example of the effects of the present invention.

For the zinc selenide samples, FIG. 2 illustrates a further indication of output intensity (CL) vs. power. In this respect, a sample of zinc selenide is compared before and after low temperature annealing. The annealing is carried out with a 20 KEV electron beam, and the unannealed areas showed strong saturation behavior with current densities greater than $10^{-3}$ A/cm$^2$, while the annealed area shows a nearly linear response up to current densities of $5\times10^{-1}$ A/cm$^2$. The change in the shape of the curve indicates either the removal of a killer center upon annealing, or enhancement of the radiative center concentration, thereby increasing the luminescence efficiency.

The present invention presents several potential applications to improve luminescence materials for displays, both in electron beam writing and materials characterization. One can selectively induce changes in the luminescence behavior of materials with spatial resolutions of one micron or better, or even over larger areas. This results in the application of the low temperature annealing technique to (a) luminescent displays, including CRT phosphors, and (b) optical storing.

In materials characterization, the careful studying of differences between the improved or annealed materials and the unannealed materials results in a basic understanding of the mechansims controlling the optical and electrical behavior of the material. The technique of low temperature annealing can be extended to a wide variety of luminescence materials including families of semiconductor materials in the II-VI and III-V compounds, and electron beam annealing of CRT phosphors in-situ may be carried out in order to improve linearity and efficiency in the CRT phosphor resulting in a brighter CRT display.

While various embodiments of the present invention have been described, it is not intended to limit the present invention to only the specifically described embodiments, and all modifications suggested from the description of the invention are intended to be included.

What we claim:

1. A process for annealing luminescence material comprising
   inserting a luminescence material into an enclosed region,
   providing a vacuum in said region,
   simultaneously cooling said material to the vicinity of liquid nitrogen temperatures, and
   thereafter exposing said material to an electron beam in the range of 20 to 27.5 KEV to cause annealing of said material.

2. A process according to claim 1, wherein said annealing is carried out for 2 to 32 seconds.

3. A process according to claim 1, wherein said annealing is carried out at a current ranging from $4\times10^{-7}$ amp through $6\times10^{-8}$ amp.

4. A process according to claim 1, wherein said annealing is carried out over an area of $10\times10$ microns.

5. A process according to claim 1, wherein said electron beam is applied to cause annealing of a CRT phosphor surface.

6. A process according to claim 2, wherein said annealing is carried out at a current ranging from $4\times10^{-7}$ amp through $6\times10^{-8}$ amp.

7. A process according to claim 2, wherein said annealing is carried out over an area of $10\times10$ microns.

8. A process according to claim 6, wherein said annealing is carried out over an area of $10\times10$ microns.

9. A process according to claim 8, wherein said luminescence material is a semiconductor of Group II-VI or Group III-V.

10. A process according to claim 9, wherein said luminescence material is one of ZnSe or GaAs.

11. A process according to claim 3, wherein said annealing is carried out over an area of $10\times10$ microns.

* * * * *